(No Model.)
W. A. DOBLE.
FRUIT PITTING MACHINE.
No. 497,752. Patented May 16, 1893.
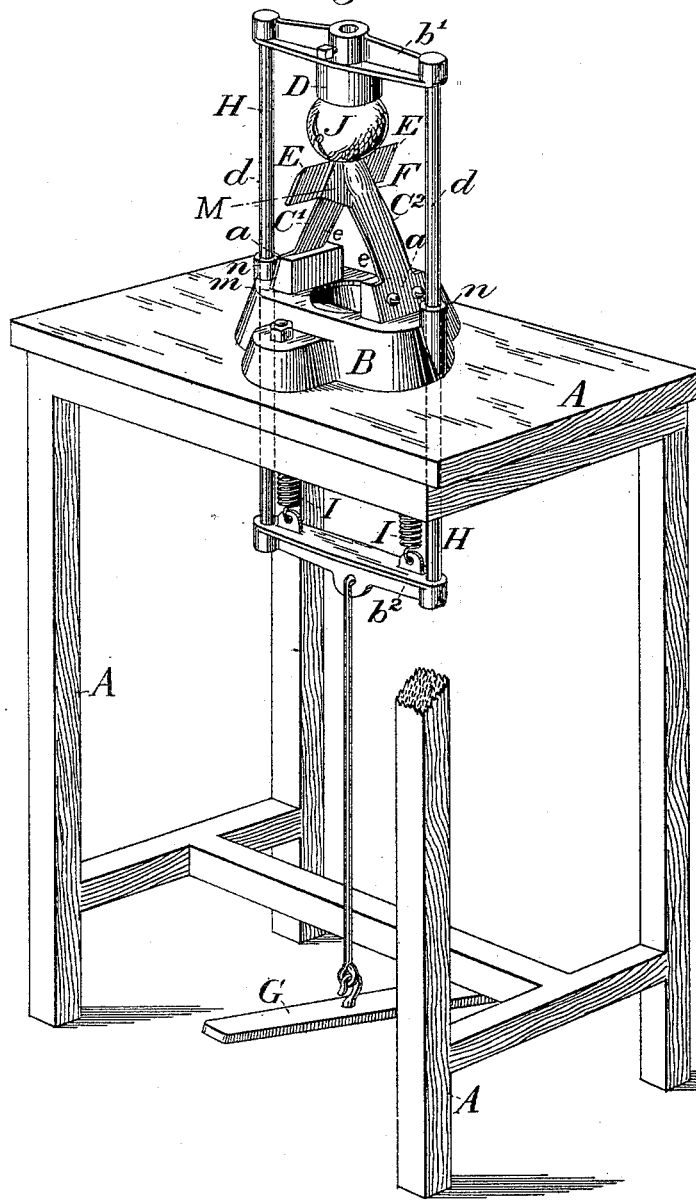
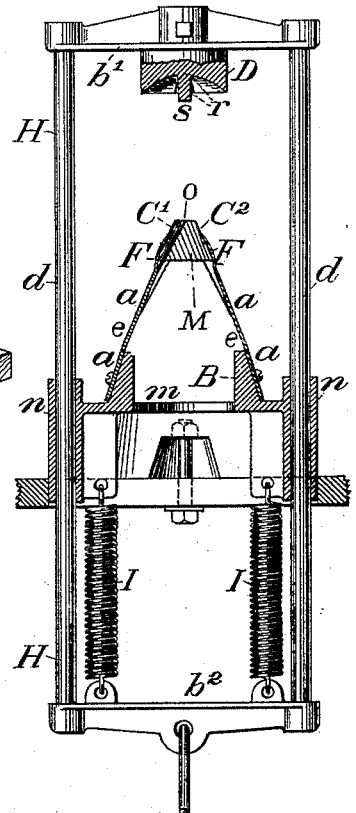
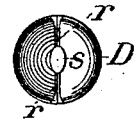
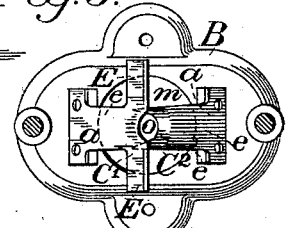
Witnesses:
E. A. Brandau
Nelson D. Bent Jr.
Inventor:
William A. Doble
By his Atty
John Richards

UNITED STATES PATENT OFFICE.

WILLIAM A. DOBLE, OF ALAMEDA, ASSIGNOR TO WILL & FINK, OF SAN FRANCISCO, CALIFORNIA.

FRUIT-PITTING MACHINE.

SPECIFICATION forming part of Letters Patent No. 497,752, dated May 16, 1893.

Application filed January 18, 1892. Serial No. 418,462. (No model.)

*To all whom it may concern:*

Be it known that I, WILLIAM A. DOBLE, a citizen of the United States, residing in the city and county of Alameda, State of California, have invented certain new and useful Improvements in Fruit-Pitting Machines; and I hereby declare the following specification, with the drawings accompanying and forming a part of the same, to be a full and exact description of my invention.

My invention relates to machines for removing the pits or stones from peaches, apricots, plums, or other fruit of the kind, and consists in the employment of two vertically set knives or cutters of a concave or arc section at their top to give rigidity at that part, and a flat section near where they are attached, so as to permit flexure, having at their tops, near the cutting edge, a recess to accommodate the passing pit or stone, also in a follower or die with a projecting plunger, or nipple, that enters the fruit centrally and ejects the pit, or stone, without crushing the surrounding pulp, also in forming the dividing knives with underlapping lips, the edges of which are diagonal to the course of the fruit and coincident with the inner face of the opposite knife.

The object of my invention is to provide a more durable form of dividing and stripping knives of simple construction, formed integrally one with the other, that can be easily made and sharpened, and to attain a more perfect performance, in preserving the pulp, cleaning the pit, and otherwise.

Referring to the drawings: Figure 1 is a perspective elevation of a fruit-pitting machine provided with my improvements. Fig. 2 is a partial section of the same, showing the construction of various parts more clearly. Fig. 3 is a plan view on the top of the stripping and dividing knives when closed or out of use. Fig. 4 is a view on the bottom of the plunger D.

In notation, letters of reference as follows, are employed to denote the principal parts:

A is a main frame on which the machine is mounted; B— an iron base to which the cutting knives are attached; $C'$ $C^2$— knives or cutters that strip or cut out the pits or stones; D— a follower or plunger for forcing the fruit down on the knives; E E— wings, or extensions of the knives for dividing the fruit, formed integrally with one or both of the stripping knives; F F— recesses to permit the knives to follow the shape of the pit or stone after its center passes the edges; G— a foot treadle to operate the machine; H— a sliding frame for operating the plunger D; I I— springs to raise the frame H and treadle G.

J— is a peach or apricot to be operated upon by the machine; M— lips on the stripping knives.

The operation of the machine is as follows: The fruit J is placed upon the top of the knives $C'$ $C^2$. The treadle G is then depressed bringing down the frame H, so that the follower D presses the fruit downward, the pin S penetrating the fruit and coming in contact with the stone as soon as the concave portion of the plunger D comes in contact with the pulp, the pit passing through the oblong perforation $o$, between the knives, so that the pulp is split into two parts, passing on each side of the dividing knives E E, the pit or stone falling down through the perforation $m$, in the base piece B. When pressure is removed from the treadle G, the springs I, I, raise the frame H to the position shown in Fig. 2, and ready to receive another peach.

The knives $C'$ $C^2$ are formed integrally with their shanks or stems $a$ $a$, bolted to the base piece B. These stems, or supporting portions are made with a concaved or curved section at the top to impart rigidity there. This section gradually changes from a curved to a flat section at $e$, $e$ as shown in Figs. 1 and 2, so as to permit bending there without danger of fracture. The cutting edges at the top are shaped as shown at $o$, in the plan view Fig. 3, leaving an oblong perforation between the two knives $C'$ $C^2$, into which the pit or stone of the fruit is pressed by the follower D. When the fruit J is pressed down by the follower D, the point of the pit or stone enters between the knives $C'$ $C^2$ bending them equally on each side in their flat section at $e$ $e$. When the center of the pit passes the edges they close again as the pit or stone comes opposite to the recesses F F, and as the shape of the pit or stone will permit.

The stripping knives or cutters C' C² are of the same form, except that one or both are provided with the wings or extensions E, and lips M for dividing the pulp. In the present case both of the splitting extensions are formed integrally with one of the stripping knives C', but it is evident that each of the knives C' and C², can be provided with one wing or dividing knife E, so that they will be duplicates. By either construction the edges are all easily accessible for sharpening, and there being no joints or detachable pieces there is more endurance and better action of the apparatus.

The lips or edges M of the knives C' and C² in the lines of their length are inclined so as to be parallel with the adjacent side of the opposite cutter so that the opposite edges of the pit will be trimmed thereby in its vertical descent under plunger D.

To cause a balanced or central action of the follower D, and thus avoid lateral strain on the knives, I employ the frame H, having guiding rods d at the sides, sliding in sleeves n n, cast on the base piece B, as shown in Fig. 2.

The treadle G is attached centrally to the lower cross-bar b², directly in the line of the plunger D, above which is set central on the upper cross-bar b', the sliding frame H.

The follower D is provided at its center with a projecting plunger S, as shown in Figs. 2 and 4, the diameter of which is preferably less than that of the pit or stone, and as it enters the stem end of the fruit in advance of the concave face of the follower D, the pit or stone is pressed out without crushing the pulp or flowing it over the knives, as is the case if such followers have only a concave face.

The face of the plunger D is scored at r r to permit the knives E E to completely sever the fruit, and permit the two halves to fall independently.

The follower D is an important feature in the operation of the machine, because it leaves the fruit in its natural shape after treatment.

Having thus described the nature and objects of my invention and the manner of constructing the same, what I claim as new, and desire to secure by Letters Patent, is—

1. In a fruit pitting machine, two obliquely set knives whose lips or edges in the lines of their length are inclined so as to be parallel with the adjacent side of the opposite cutter so that the opposite edges of the pit will be trimmed thereby in its vertical descent under the plunger, substantially as described.

2. In a fruit pitting machine, the obliquely set flexible knives whose lips or edges in the lines of their length are inclined so as to be parallel with the adjacent side of the opposite cutter so that the opposite edges of the pit will be trimmed thereby in its vertical descent, in combination with a concave faced plunger which is provided with a second plunger or pin located centrally therein, substantially as and for the purpose set forth.

3. In a fruit pitting machine, the flexible knives C' and C² whose lips or edges M in the lines of their length are inclined so as to be parallel with the adjacent side of the opposite cutter so that the opposite edges of the pit will be trimmed thereby in its vertical descent, said knives C' and C² being mounted and operating as herein described, a reciprocating concave faced plunger with a central opening projecting beyond the concave face, a reciprocating frame operated by a treadle and having a cross head b' provided with a cylindrical socket to receive the plunger, substantially as described.

4. In a fruit pitting machine, the combination of the obliquely set knives C' and C², having lips or edges M which are inclined in the lines of their length so as to be parallel with the adjacent side of the opposite cutter, a reciprocating concave faced plunger having a central core pin S, a reciprocating frame composed of two cylindrical rods d d, connected by a cross bar b² at the bottom and a cross head b' at the top, the latter being provided with a cylindrical socket to receive the plunger D, substantially as described.

5. In a fruit pitting machine, two obliquely set flexible knives C' and C² having lips or edges M which are inclined in the lines of their length so as to be parallel with the adjacent side of the opposite cutter, in combination with a concave faced plunger D, a main frame A, a reciprocating frame for operating the plunger D, a treadle G to depress said frame and coiled lifting springs I I placed beneath the top of the main frame to raise the plunger D and lift the treadle G, substantially as described.

In testimony whereof I have hereunto affixed my signature in the presence of two witnesses.

WILLIAM A. DOBLE.

Witnesses:
ALFRED A. ENQUIST,
WILSON D. BENT, Jr.